(No Model.)
J. H. GRIFFIN.
PLUMBER'S CLAMP.
No. 576,758.
Patented Feb. 9, 1897.
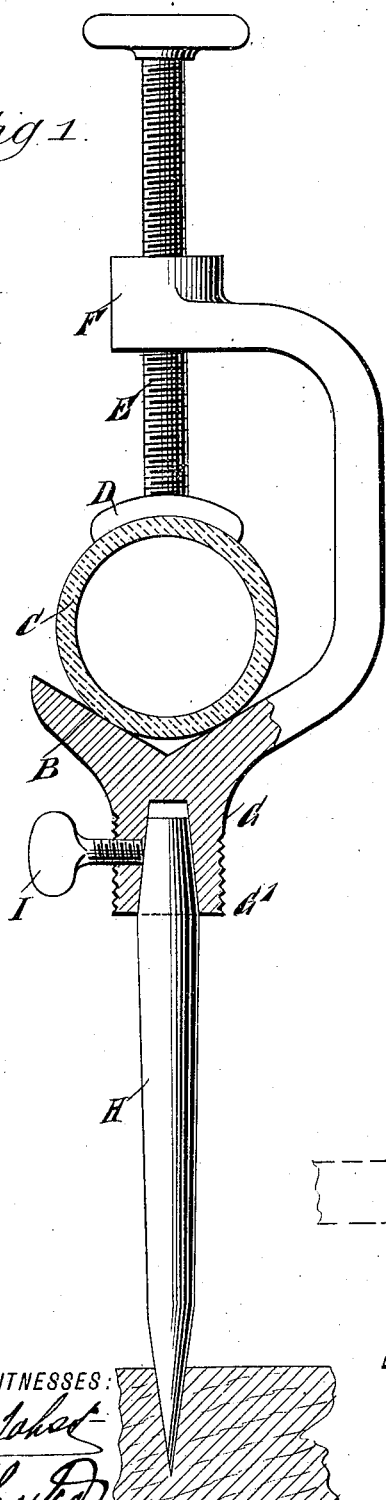
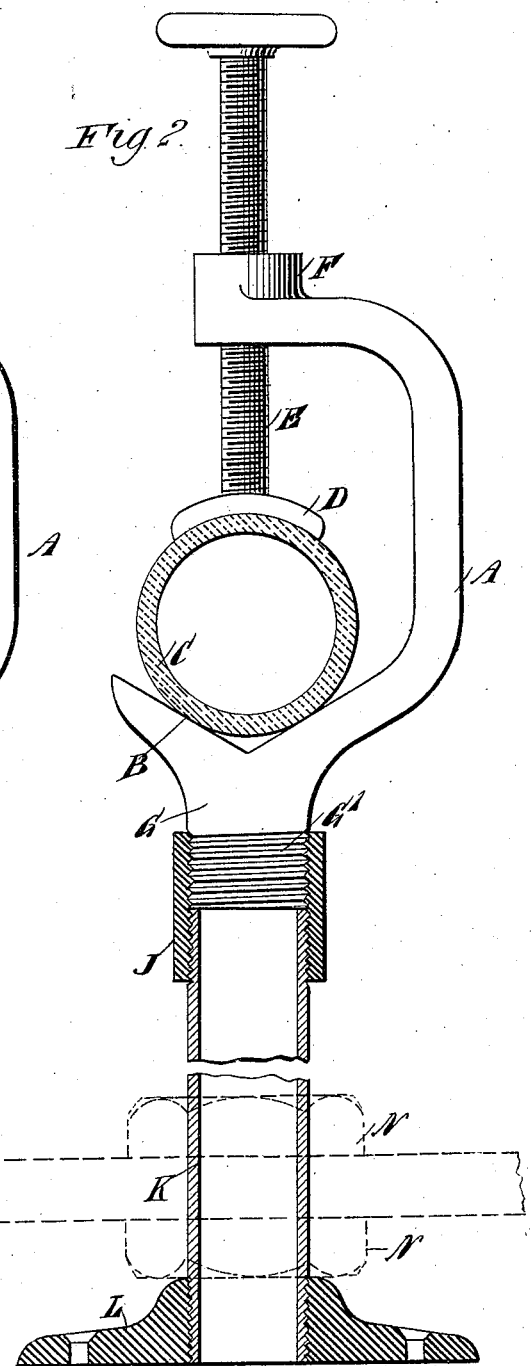

UNITED STATES PATENT OFFICE.

JAMES HARVEY GRIFFIN, OF NEW YORK, N. Y.

PLUMBER'S CLAMP.

SPECIFICATION forming part of Letters Patent No. 576,758, dated February 9, 1897.

Application filed February 20, 1896. Serial No. 580,096. (No model.)

*To all whom it may concern:*

Be it known that I, JAMES HARVEY GRIFFIN, of New York city, in the county and State of New York, have invented a new and Improved Plumber's Clamp, of which the following is a full, clear, and exact description.

The object of the invention is to provide a new and improved plumber's clamp, more especially designed for temporarily holding lead pipes in place while wiping a joint thereon.

The invention consists of certain parts and details and combinations of the same, as will be fully described hereinafter and then pointed out in the claim.

Reference is to be had to the accompanying drawings, forming a part of this specification, in which similar characters of reference indicate corresponding parts in both the figures.

Figure 1 is a side elevation of the improvement with parts in section and with the pipe shown in position, and Fig. 2 is a like view of the same as arranged for bench use.

The improved plumber's clamp is provided with an arm A, made approximately U-shaped, and formed at one end with a V-shaped seat B, adapted to receive the pipe C to be temporarily held in place. A segmental clamping-plate D is adapted to engage said pipe C directly opposite the seat B, to securely hold the pipe in place on the seat, and this clamping-plate D is held on a screw-rod E, screwing in a nut F, formed on the end of the arm A opposite that of the seat B.

The outer side of the seat B is formed with a socket G, adapted to receive the tapering end of a pin H, adapted to be driven into a floor, wall, or other support adjacent to the pipe in the building in which the pipe is to be located. In case the pin H is driven into a wall to extend horizontally therefrom then I employ a set-screw I, screwing in the socket G for securely holding the socket on the tapering end of the pin H. The socket G is formed with an external thread G' for permitting of conveniently using the clamp on a bench in the shop, and in this case a nut J screws on the thread G' and is connected with a pipe K, provided at its lower end either with a base L, fastened by set-screws to the bench, or provided with nuts N (shown in dotted lines) for engaging the top and bottom surfaces of the bench.

Now it will be seen that by the arrangement described the pin H and pipe K are in axial alinement with the screw-rod E and seat B, to bring the strain of clamping the pipe in place in the proper direction on the pin H or pipe K. The clamps are used in pairs and the operator in setting up the clamp first drives the pins H in the floor or wall, and then engages the sockets G with the tapering end of the pins, the arms A then being turned in the proper direction for receiving the pipe C at the seats B. The screw-rods E are then screwed down, so as to bring the clamping-plates D in engagement with the pipe C to securely hold the same in place.

Having thus fully described my invention, I claim as new and desire to secure by Letters Patent—

A plumber's clamp, comprising a U-shaped clamping-arm formed at one end with a V-shaped seat for the pipe and at the opposite end with a nut, a screw-rod arranged to work in said nut and provided with a segmental clamping-plate, said plate being adapted to engage said pipe directly opposite said seat, said seat being formed with an extended socket on its outer side, and a supporting-pin received in said socket in direct line with said screw-rod and seat, as and for the purpose set forth.

JAMES HARVEY GRIFFIN.

Witnesses:
   THEO. G. HOSTER,
   JNO. M. RITTER.